US010364955B2

(12) United States Patent
Rubia et al.

(10) Patent No.: US 10,364,955 B2
(45) Date of Patent: Jul. 30, 2019

(54) ILLUMINATION MODULE FOR A MOTOR VEHICLE

(71) Applicant: VALEO ILUMINACION, Martos (ES)

(72) Inventors: Juan-Antonio Rubia, Martos (ES);
Leandro Rodriguez, Martos (ES);
Ramon Sanchez, Martos (ES);
Juan-Francisco Moreno, Martos (ES);
Damien Cabanne, Martos (ES);
Ricardo Fernandez, Martos (ES); Eric Moisy, Martos (ES)

(73) Assignee: VALEO ILUMINACION, Martos (ES)

( * ) Notice: Subject to any disclaimer, the term of this patent is extended or adjusted under 35 U.S.C. 154(b) by 0 days.

(21) Appl. No.: 15/644,088

(22) Filed: Jul. 7, 2017

(65) Prior Publication Data

US 2018/0010753 A1 Jan. 11, 2018

(30) Foreign Application Priority Data

Jul. 7, 2016 (FR) .................................... 16 56526

(51) Int. Cl.
| | |
|---|---|
| *B60Q 3/74* | (2017.01) |
| *F21S 41/19* | (2018.01) |
| *F21S 43/19* | (2018.01) |
| *H01R 12/70* | (2011.01) |
| *H01R 13/24* | (2006.01) |

(Continued)

(52) U.S. Cl.
CPC ............ *F21S 41/192* (2018.01); *B60Q 3/745* (2017.02); *F21S 41/155* (2018.01); *F21S 43/145* (2018.01); *F21S 43/195* (2018.01); *H01R 12/7076* (2013.01); *H01R 13/2414* (2013.01);

(Continued)

(58) Field of Classification Search
CPC ...... F21S 41/192; F21S 43/195; F21S 43/145; F21S 41/155; B60Q 3/745; H01R 13/2414; H01R 24/68; H01R 12/7076; H01R 2107/00; H01R 2201/26
See application file for complete search history.

(56) References Cited

U.S. PATENT DOCUMENTS

| | | | | |
|---|---|---|---|---|
| 6,715,909 B2* | 4/2004 | Serizawa | ............... | B60Q 1/302 362/362 |
| 7,140,760 B2* | 11/2006 | Kidd | .................... | B60Q 1/0064 362/549 |

(Continued)

FOREIGN PATENT DOCUMENTS

| | | |
|---|---|---|
| EP | 2 995 850 A1 | 3/2016 |
| WO | WO 2015/098822 A1 | 7/2015 |

OTHER PUBLICATIONS

French Preliminary Search Report dated Jan. 24, 2017 in French Application 16 56526 filed on Jul. 7, 2016 (with English Translation of Categories of Cited Documents).

*Primary Examiner* — Sonji N Johnson
(74) *Attorney, Agent, or Firm* — Oblon, McClelland, Maier & Neustadt, L.L.P.

(57) ABSTRACT

An illumination module for a motor vehicle that includes at least one organic electroluminescent diode capable of being received in a support equipped with means for connecting same to a device for supplying electrical power and/or controlling a lighting and/or signaling assembly of the vehicle. The support has at least one connection bar formed in a flexible base material impregnated with conducting material, arranged in layers.

21 Claims, 2 Drawing Sheets

(51) Int. Cl.
*H01R 24/68* (2011.01)
*F21S 41/155* (2018.01)
*F21S 43/145* (2018.01)
*H01R 107/00* (2006.01)

(52) U.S. Cl.
CPC ......... *H01R 24/68* (2013.01); *H01R 2107/00* (2013.01); *H01R 2201/26* (2013.01)

(56) References Cited

U.S. PATENT DOCUMENTS

2001/0012706 A1  8/2001  Imaeda
2016/0081159 A1  3/2016  Jin et al.
2016/0290586 A1  10/2016  Shido et al.

* cited by examiner

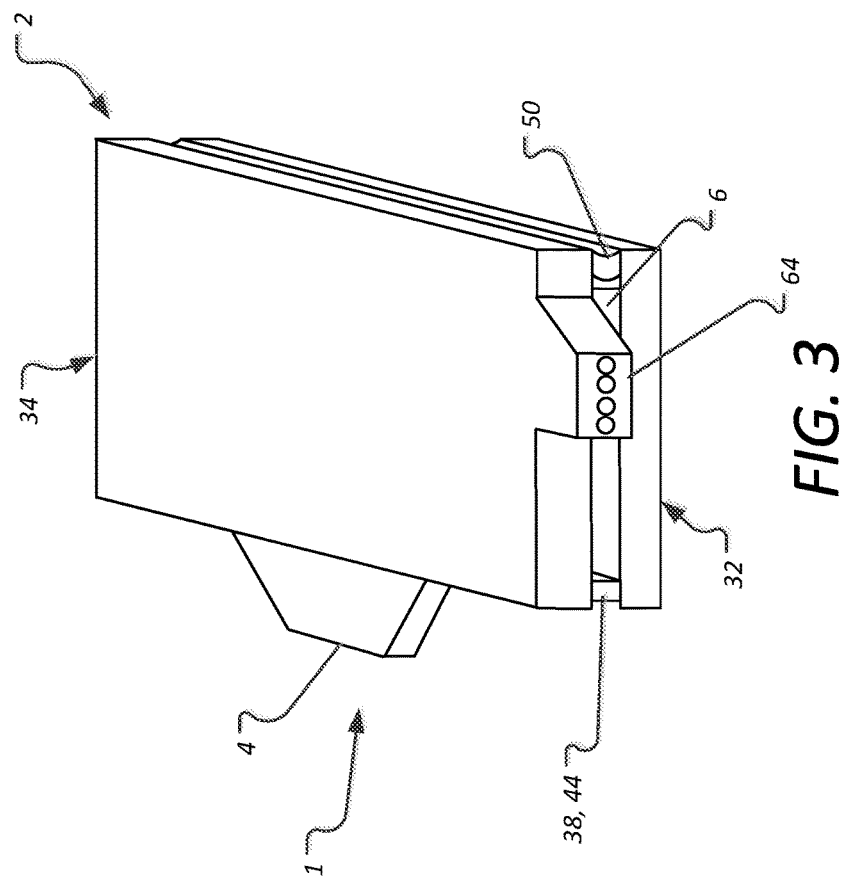

ILLUMINATION MODULE FOR A MOTOR VEHICLE

The lighting and/or signaling devices of a motor vehicle have, first, to meet functional criteria, such as the illumination power and the precise arrangement required for producing a specific, approved beam, or, alternatively, a long service life, minimal overall size, and ease of use, and they must, second, meet esthetic conditions imposed by automobile constructors connected with the visual identification of their vehicle.

The use of illumination sources that use one or more electroluminescent diodes has become commonplace.

The use of organic electroluminescent diodes, which are also designated herein by the acronym OLED (Organic Light Emitting Diode) has recently increased and is conventionally composed of two electrodes (an anode and cathode) between which are placed at least one emission layer, produced from an electroluminescent material, plus an assembly of electron transport layers, the emission layer and electron transport layers all being produced from organic materials. A voltage has to be applied between the two electrodes in order to excite the transport layers and the emission layer, and to obtain the electroluminescence of the material constituting said emission layer.

Although the illumination power emitted by an OLED-type source is less than that emitted by a non-organic electroluminescent diode (LED) source, such sources are increasingly used in the automobile field both for actual vehicle lighting or signaling and for esthetic reasons, in particular the visual, luminous signature of the vehicle.

An illumination module with OLED for a motor vehicle is generally composed of an emissive part arranged opposite a lens of a headlamp and a connection part via which this illumination module is connected to a device for supplying electrical power to the vehicle lighting and/or signaling device and for controlling same. This connection part is a weak point of such modules, given the very nature of the materials of which the OLED module is composed and their mechanical properties and the plug-in force that the connection part has to withstand upon its insertion into a corresponding socket. The context of installation in a motor vehicle, which produces vibrations, accelerations and thermal stresses, increases the risk of rupture of this non-robust connection.

The object of the invention is to remedy this drawback and to propose an illumination module for a motor vehicle that employs one or more illumination sources with organic electroluminescent diodes, in which the risk of rupture of the electrical connection of these sources is minimised.

The present invention relates to an illumination module for a motor vehicle employing at least one organic electroluminescent diode capable of being received in a support equipped with means for connecting same to a device for supplying electrical power and/or controlling the electrical power supply of the diode, the diode carrying at least one first conductor terminal designed to be connected electrically to at least a second conductor terminal. An intermediate connection element, at least a portion of which is produced from flexible material and having at least one conducting part, is arranged between the one or more first and the one or more second conductor terminals when they are electrically connected.

The one or more second conductor terminals may be carried by the support or, alternately, be arranged at a distance from the support.

According to a feature of the invention, the intermediate connection element may comprise at least one connection portion produced from a conducting material and one damping portion produced from a flexible material. The intermediate connection element may, in particular, be arranged in such a manner that the connection portion comes between the one or more first and the one or more second terminals when these terminals are electrically connected.

The thickness of the connection portion may be substantially less than the thickness of the damping portion, in particular of negligible thickness. In particular, the thickness of the connection portion may be such that the connection portion is elastically deformable.

The illumination module may be a module for lighting up the road, a signaling module of the vehicle, or a module for lighting up the interior of the vehicle.

According to various features of the invention, taken alone or in combination, it will be possible to provide for:
the flexible material forming the damping portion of the intermediate connection element having a high electrical resistivity; the flexible material is, in particular, an electrically insulating material;
the flexible material forming the damping portion of the intermediate connection element being a silicone;
the connection portion comprising a connection layer and the damping portion comprising at least two damping layers between which the connection layer is arranged;
the intermediate connection portion comprising a stack of connection layers and of damping layers;
the stack being produced in such a manner that each connection layer is separated from the closest connection layer by a damping layer; in other words, each connection layer is intercalated between two damping layers;
said at least one organic electroluminescent diode comprising an emissive part and a connection part designed to make the electrical connection with a device for supplying power to and/or controlling the lighting or signaling assembly of the vehicle, and the connection part comprising a set of first conductor terminals, each of which is connected to said emissive part by a conducting track;
the number of first conductor terminals potentially being defined as a function of the arrangement of the emissive part of the organic electroluminescent diode and, in particular, as a function of the number of distinct lighting surfaces that this emissive part comprises. By way of example, provision may be made for there to be a negative supply terminal, i.e. connected to ground, common to each of the lighting surfaces, and a positive supply terminal specific to each of the lighting surfaces;
the support comprising a base forming a cavity capable of receiving the connection part of said at least one organic electroluminescent diode, and this base comprising means for holding said connection part in the cavity;
the support potentially being arranged such that the protection cap is mounted pivotably on the base, on one of the edges, in order to allow an open position in which the base is perceivable and a closed position in which the protection cap covers over the base;
the protection cap and the base of the support of the organic electroluminescent diode each comprising complementary means capable of interacting in order to allow said protection cap to be held in position on said base.

Provision may be made for the intermediate connection element to be attached to an interior face of a protection cap of the support: the cap is, as appropriate, configured in order to come into a closed position, covering over the cavity when the connection part is housed in the cavity, the interior face being the face opposite the connection part in the "closed" position.

Provision may also be made for:
each layer of conducting material of the connection bar potentially being connected to a conducting track arranged on the interior face of the protection cap, these conducting tracks coming together in a connector capable of interacting with a complementary connector of the lighting or signaling assembly of the vehicle;
the first conductor terminals of said at least one organic electroluminescent diode and the connection bar being arranged in such a manner that, when the protection cap is placed on the connection part of said at least one organic electroluminescent diode, each conductor terminal of the latter is in contact with a conducting-material layer of the connection bar.

In a variant, the support may comprise a protection cap provided with a window, the intermediate connection element being mounted on the organic electroluminescent diode in such a manner as to pass through the window when the OLED is mounted on the support. As appropriate, the support may not have an electrical connection element and be designed to come into contact with a connector comprising said second connection terminal arranged in line with the window.

It will be understood that the at least one second conductor terminal may be carried by the support or, alternately, in a variant, be arranged at a distance from the support.

The invention also relates to a lighting and/or signaling device of a motor vehicle comprising at least one illumination module as described above.

Further features, details and advantages of the invention will become more clearly apparent from reading the description given below by way of illustration and with reference to the following figures:

FIG. 3 is a schematic view in perspective of a support illustrated in FIG. 2 and a diode illustrated in FIG. 1 in a closed state in an illumination module according to the invention.

It should first of all be noted that although the figures set out the invention in detail for implementing the invention, said figures may be used in order better to define the invention if necessary.

In the following text, the notions of "length" and "width" will refer, in the case of elements of substantially rectangular or parallelepipedal form, respectively to the dimensions of the larger sides and of the smaller sides of these forms.

Figure 1:
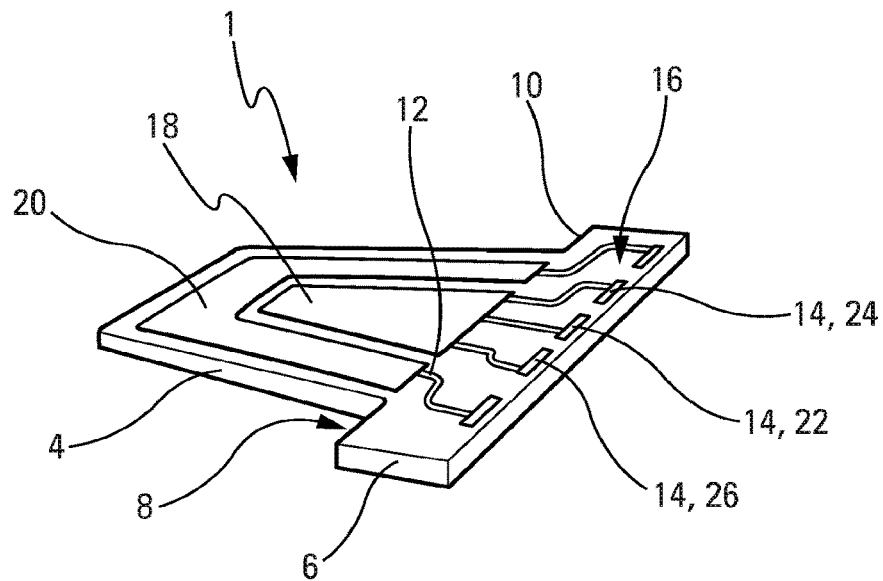
FIG. 1 is a schematic view in perspective of an organic electroluminescent diode of an illumination module according to the invention.

An illumination module according to the invention comprises at least one organic electroluminescent diode (or OLED, in the following text) 1, received in a support 2. The organic electroluminescent diode 1, illustrated on its own in FIG. 1, comprises an emissive part 4, and a connection part 6 designed to allow the electrical connection of the emissive part to a device for providing electrical power and/or controlling the signaling and/or lighting assembly of the vehicle, which is not shown here. The emissive part 4 is conventionally composed of a set of polymer layers sandwiched between an anode and a cathode, and it may have, account being taken of the nature of the materials of which it is composed, a degree of mechanical flexibility. According to different embodiments, the emissive part 4 of the OLED 1 may comprise one or more distinct lighting faces. The connection part 6 is produced from an insulating material that is mechanically more rigid and, for example, and in a non-limiting manner, a glass or polymer resin. According to the embodiment illustrated more particularly in the figures, it may be in the form of a substantially parallelepipedal plate from one of the major sides of which the emissive part 4 of the OLED 1 extends. In more detail, the emissive part 4 of the OLED 1 extends the connection part 6, substantially in the same plane, from a first major side 8 of the plate, forming said connection part, substantially at the centre of this first major side, such that shoulder edges 10 are arranged on either side of the emissive part.

In order to achieve the electrical connection of the OLED 1 with an electrical power supply and/or controlling device, conducting tracks 12 are arranged in the connection part 6. Each of these conducting tracks originates from the emissive part 4 of the OLED 1 and ends on the plate forming the connection part 6 of the latter, in the form of a first conductor terminal 14. Advantageously, the first conductor terminals 14 are all arranged on a first face 16 of the connection part 6, visible in FIG. 1, and in series in accordance with a first direction of extension. It will be understood that the number of first conductor terminals 14 is defined as a function of the emissive part 4 of the OLED 1 and, in particular, as a function of the number of distinct lighting surfaces that the emissive part 4 of the OLED 1 comprises. Provision may in particular be made for there to be a negative supply terminal, i.e. connected to ground, common to each of the lighting surfaces, and a positive supply terminal specific to each of the lighting surfaces. In the case illustrated, the emissive part 4 comprises two emission zones, with a central emission zone 18 and a peripheral emission zone 20. According to traffic conditions, or the esthetic effects sought, the control module associated with the lighting and/or signaling device may send an instruction for the central emission zone to light up, an instruction for the peripheral emission zone to light up, or an instruction for these two zones to light up simultaneously. As illustrated, provision has been made for a single negative terminal 22, common to the two emission zones, and four positive terminals.

Two terminals 24 are connected to the central emission zone 18 and two terminals 26 are connected to the peripheral emission zone 20, two terminals being associated with each of the zones in order to facilitate a uniform power supply and lighting of the corresponding zone.

It will be understood that the number of first conductor terminals 14 is greater than the number of distinct lighting surfaces defined in the emissive part 4 of the OLED 1.

Figure 2:
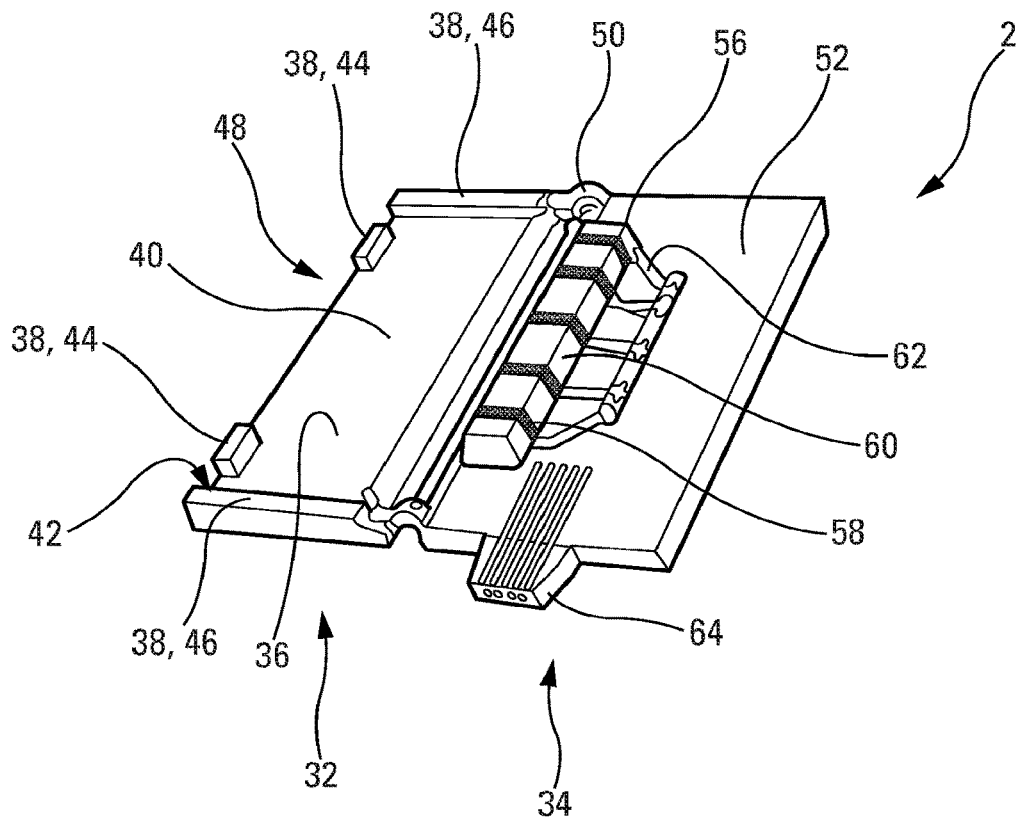
FIG. 2 is a schematic view in perspective of a support of a diode such as that illustrated in FIG. 1 in an illumination module according to the invention.

The support 2, illustrated on its own in FIG. 2, in a particular embodiment, comprises a base 32 and a protection cap 34 mounted pivotably on one of the edges to allow an open position (visible in FIG. 2) in which the base is perceivable and a closed position in which the protection cap 34 covers over the base 32.

The base 32 has a back wall 36 in the form, according to the embodiment illustrated in the figures, of a substantially rectangular plate of which the dimensions are substantially identical to those of a lower face of the connection part 6 of the OLED 1, i.e. the face opposite the first face 16, called the "upper" face, of this same connection part 6 on which the first conductor terminals 14 are arranged.

The base 32 further comprises lateral walls 38 bordering the back wall at least partially. The lateral walls extend the back wall 36 substantially perpendicularly, defining a kind of cavity 40 capable of receiving the connection part 6, the upper end 42 of these lateral walls 38, i.e. the end turned away from the back wall 36, being capable of acting as position stop for the protection cap 34 in the closed position thereof.

In a variant that is not shown, the base 32 of the support 2 may also comprise elements that make it possible to facilitate the engagement and positioning of the connection part 6 of the OLED 1 within the cavity 40 and, for example, a form capable of interacting with a complementary form defined on the connection part 6.

It will be understood that the lateral walls 38 make it possible to hold the connection part 6 of the OLED 1 transversely inside the cavity while the back wall 36 and the protection cap 34, when it is in its closed position, hold said part vertically.

According to the embodiment illustrated more particularly in the figures, these holding means consist of a set of lateral stops 44 arranged in series on one of the major sides of the back wall 36 and a set of lateral walls 46 arranged in parallel along the smaller sides of the back wall 36, substantially over the entire length of these smaller sides.

More precisely, these holding means are defined and arranged such that, when the connection part 6 of the OLED 1 is received against the back wall 36 in the cavity 40, the lateral stops 44 form stops against the thickness of the first major side 8 of the plate forming said connection part 6, while the lateral walls 46 form a stop against the thickness of the smaller sides of the plate forming said connection part 6.

The set of lateral walls thus defines a kind of frame in which the connection part 6 of the OLED 1 is received and held.

The lateral stops 44 are arranged along the major side of the base and are spaced out in order to form a passage 48 for the OLED 1. Thus, when the protection cap 34 is folded down on the base 32, the connection part 6 can be housed in the cavity 40 of the support while the emissive part 4 can extend outside the support in order to play a part in the lighting and/or signaling function. The two lateral stops 44 on either side of the passage 48 form stops interacting with the shoulder edges 10 of the connection part 6 of the OLED 1.

As will be described below, the major side opposite that carrying the lateral stops 44 is associated with the articulation means of the protection cap 34 on the base 32.

The protection cap 34 is capable of closing the cavity 40 described above. More precisely, this protection cap 34 is capable of being placed in a closed position on the upper face of the plate forming the connection part 6 of the OLED 1 once the latter has been received in the cavity 40 of the support 2. Advantageously, the protection cap 34 thus has a substantially parallelepipedal form, the dimensions of which complement those of the base 32 of the support 2.

In order to move from the open position, illustrated in FIG. 2, to a closed position that is not shown in the figures and in which it closes off the cavity 40, the protection cap 34 is articulated on the base 32 by means of a hinge 50. More precisely, according to this embodiment, the hinge 50 is constituted by two pivots, one at either end of the major side of the base 32 of the support 2 opposite the first major side 8 on which the lateral stops 44 are arranged. The protection cap 34 can thus move about the axis of rotation defined by the hinge 50, between the open position in which it provides access to the interior volume of the cavity 40 described above and a closed position in which it closes the cavity 40 described above.

The protection cap has the form of a plate with a first face 52 and a second, opposite face, these two faces being called, respectively, interior face and exterior face owing to their arrangement relative to the module when the cap is in the closed position.

Second connector terminals are provided on the first face 52 of the protection cap such that the first conductor terminals 14 carried by the OLED 1 and the second terminals can be connected electrically when the protection cap 34 is folded on the base 32, in the closed position. The electrical connection is achieved by the presence of an intermediate connection element 56 made from a flexible material and having at least one conducting portion. This intermediate element is arranged between the first and second conductor terminals and permits the electrical linking thereof by providing a buffer effect that prevents damage to the conductor terminals when the cap comes into position against the base. Provision may be made, for example, for the intermediate element to be arranged by adhesive bonding on a series of conductor terminals secured to the support, the conducting portion of the intermediate element being arranged in line with these second conductor terminals.

A description will now be given of an embodiment of the invention, illustrated in FIG. 2, according to which the intermediate connection element is formed by a connection bar 56 attached to the interior face 52 of the protection cap 34.

The bar 56 is formed from a flexible material, of silicone type, the conducting material being embedded in the thickness thereof, in such a manner as to form a stack of first conducting layers 58 and of second, insulating, damping layers 60. The choice of silicone makes it possible to obtain a flexible base material having high electrical resistivity and capable of being impregnated with conducting material. It will be understood that another material could be chosen provided it has the same characteristics of flexibility and electrical resistivity. This conducting material is embedded in the mass of the bar, forming conducting layers 58 extending in series spaced regularly from one another, in proportions that allow, on the one hand, the current to be conducted and, on the other, the flexibility of the bar to be preserved, the bar being liable to be compressed by closure of the protection cap, as will be described below.

The first conducting layers 58, or connection layers, play a part in forming a connection portion 57, and the second, insulating, damping layers 60 play a part in forming a damping portion 59. In order to preserve the flexibility of the intermediate connection element 56, the thickness of the connection portion 57 is substantially less than the thickness of the damping portion, and in particular of negligible thickness.

In FIG. 2, the connection bar 56 has the form of a substantially parallelepipedal beading, the greater length of which is placed substantially parallel to a major side of the protection cap 34, i.e. in the first direction of extension of the series of first conductor terminals produced on the OLED 1 when the latter is in position in the cavity 40. More precisely, according to the embodiment illustrated in the figures, the connection bar 56 is attached, on the interior face 52 of the protection cap 34, along the major side via which this cover is connected to the base 32 of the support 2 by means of the hinge 50. The direction of stacking of the connection layers 58 of conducting material and of the damping layers 60 of insulating material forms the direction of the greatest length of the parallelepipedal beading constituting the form of the connection bar 56, and this stacking is formed regularly in such a manner that each connection layer 58 is separated from the closest connection layer 58 by a damping layer 60 of insulating material. In other words, stacking is such that the connection layers 58 and damping layers 60 of insulating material follow one another in succession along the intermediate connection element 56.

The connection bar 56 is advantageously adhesively bonded to the interior face 52 of the protection cap and, in order to ensure the position of this bar relative to the major side near to which it extends, provision may be made to produce an impression, which is not visible in the figures, on which the adhesive bonding agent used to secure the connection bar is arranged.

According to a feature of the invention, the number of connection layers 58 of the connection bar 56 is at least equal to the number of first conductor terminals 14 arranged on the OLED 1. Advantageously, the material chosen for producing the connection layers 58 of the connection bar 56 is the same as that chosen to produce the first conductor terminals 14 of the OLED 1, and in this case a material having good electrical conductivity such as, by way of non-exhaustive examples, copper or gold, will be chosen.

Furthermore, the connection bar 56 is arranged on the interior face 52 of the protection cap 34 such that each connection layer 58 of this bar 56 is arranged in the extension of a conducting track 62 adhesively bonded or etched on the interior face 52 of the protection cap 34. These conducting tracks are all connected to a complementary connector 64 of a connector of an electrical power supply and/or controlling device of the lighting and/or signaling assembly of the vehicle such that the electrical power supply via the connector 64 allows the electrical connection of the connection layers 58 of the connection bar.

The connection bar 56 is arranged on the interior face of the protection cap 34 such that when the plate forming the connection portion 6 of the OLED 1 is received in the cavity 40 of the support 2 and when the protection cap 34 of this same support 2 is folded in order to close this cavity each first conductor terminal 14 of the OLED 1 is in contact with one of the connection layers 58 of the connection bar 56. In other words, when the protection cap 34 is folded in the closed position in order to cover over the cavity 40 of the support 2, once the connection portion 6 of the OLED 1 has been received in this cavity, the connection bar is held, or in more descriptive terms "sandwiched", between the connection part 6 of the OLED 1 and the protection cap 34.

It will be understood that the hinge 50 is defined as a function of the thickness of the connection bar 56 such that it allows optimal placing of the latter on the plate forming the connection portion 6 of the OLED 1 and hence optimal electrical contact between the first conductor terminals 14 of the OLED 1 and the connection layers 58 of the connection bar 56. According to other, alternate, embodiments, the protection cap 34 may be produced in the form of a separate component secured to the base 32 of the support 2, for example by clipping. Irrespective of the embodiment chosen, the invention makes provision for the base 32 of the support 2 and the protection cap 34 each to have complementary means (not shown in the figures) enabling them to be kept assembled such as to maintain a quality electrical contact between the connection layers 58 of the connection bar 56 and the first conductor terminals of the connection portion 6 of the OLED 1. By way of non-limiting examples, this may be a hook (not shown in the figures) integral with the protection cap 34 and capable of engaging under the base 32 of the support 2 or in a notch made in the latter.

When the protection cap is folded on the connection part 6 of the OLED present in the support, the connection bar 56 made from silicone is compressed against this connection portion 6 of the OLED carrying the first connection terminals 14. The flexibility of the silicone makes it possible not to generate a rigid contact that will give rise to potential stresses at the moment of this contract.

In FIG. 3, the hinge 50 of support 2 is in a closed state with the OLED 1 seated between the base 32 and the protection cap 34 of the support 2.

According to an alternate embodiment of the invention, which is not shown in the figures, an opening, or window, may be made in the protection cap 34, with dimensions equivalent to those of the intermediate connection element 56. In this variant, the intermediate connection element is secured on the organic electroluminescent diode in such a manner as to pass through the window when the OLED is mounted on the support. The linking of the connection bar 56, carried by the OLED in such a manner as to be in contact with the first conductor terminals 14, with an electrical power supply and/or control device of the lighting and/or signaling assembly of the vehicle may be directly achieved outside the support when the protection cap 34 is in the closed position, since the intermediate connection element is caused to pass through this opening. It is possible then to dispense with the connector 64 of the protection cap 34.

The invention thus achieves its object by proposing an illumination module that employs an OLED 1, the mounting of which in the associated support and the electrical connection of which resulting therefrom are rendered reliable owing to the flexibility of the silicone forming the buffer between the connection part of the OLED and the folded-down protection cap carrying the partially conducting silicone, this flexibility making it possible for the protection cap to be pressed down very firmly on the connection part 6 of the OLED without the risk of the latter breaking.

It should, however, be noted that the invention is not restricted to the means and configurations described and illustrated but applies, likewise, to all equivalent means or configurations and to any combination of such means.

In particular, although the invention has been described above in an embodiment in which a single organic electroluminescent diode is associated with a single support in the illumination module in question, it goes without saying that the invention extends without limitation to those cases where a number of organic electroluminescent diodes are associated with one and the same support or those cases where the illumination module in question comprises a plurality of organic electroluminescent diodes and a plurality of supports. Similarly, the forms of the connection portion 6 of the OLED and of the support 2 described herein are indicative, and the invention extends also to any other form of connection portion and of support provided the support allows reliable positioning of the OLED so that the first conductor terminals of the OLED are opposite the first conductor terminals of the support and it is possible thus to achieve a connection by contact of the partially conducting silicone carried by the protection cap on first conducting terminals formed on the connection portion of the OLED without risk of the latter being damaged.

The invention claimed is:

1. An illumination module for a motor vehicle comprising:
   at least one organic electroluminescent diode that is received in a support equipped with a connection to said at least one organic electroluminescent diode and a device to supply electrical power and/or control the electrical power supply of said diode, the support including a hinge that is closed when said diode is connected to the electrical power supply, said diode carrying at least one first conductor terminal designed to be connected electrically to at least a second conductor terminal of an intermediate connection element, the intermediate connection element including at least an insulating part of which is produced from flexible material and including at least one conducting part, the insulating part and the at least one conducting part being arranged between said first and second conductor terminals when they are electrically connected.

2. The module according to claim 1, wherein the intermediate connection element comprises at least one connection portion produced from a conducting material and one damping portion produced from a flexible material.

3. The module according to claim 2, wherein the thickness of the connection portion is substantially less than the thickness of the damping portion, in particular of negligible thickness.

4. The module according to claim 3, wherein the flexible material forming the damping portion has a high electrical resistivity.

5. The module according to claim 3, wherein the flexible material forming the damping portion is a silicone.

6. The module according to claim 3, wherein the connection portion comprises a connection layer, the damping portion comprises at least two damping layers between which the connection layer is arranged.

7. The module according to claim 2, wherein the flexible material forming the damping portion has a high electrical resistivity.

8. The module according to claim 2, wherein the flexible material forming the damping portion is a silicone.

9. The module according to claim 2, wherein the connection portion comprises a connection layer, and the damping portion comprises at least two damping layers between which the connection layer is arranged.

10. The module according to claim 9, wherein the intermediate connection element comprises a stack of connection layers and damping layers.

11. The module according to claim 10, wherein the stack is produced in such a manner that each connection layer is separated from the closest connection layer by a damping layer.

12. The module according to claim 2, wherein the intermediate connection element is attached to an interior face of a protection cap of the support.

13. The module according to claim 2, wherein said at least one organic electroluminescent diode comprises an emissive part and a connection part designed to make the electrical connection with a device to supply power to and/or control the lighting or signaling assembly of the vehicle, wherein said connection part comprises a set of first conductor terminals, each of which is connected to said emissive part by a conducting track.

14. The module according to claim 1, wherein said at least one organic electroluminescent diode comprises an emissive part and a connection part designed to make the electrical connection with a device to supply power to and/or control the lighting or signaling assembly of the vehicle, wherein said connection part comprises a set of first conductor terminals, each of which is connected to said emissive part by a conducting track.

15. The module according to claim 14, wherein the support comprises a base forming a cavity that receives the connection part of said at least one organic electroluminescent diode, and this base comprises a holding portion to hold said connection part in the cavity.

16. The module according to claim 15, wherein the intermediate connection element is attached to an interior face of a protection cap of the support.

17. The module according to claim 16, wherein each connection layer of the intermediate connection element is connected to a conducting track arranged on the interior face of the protection cap, each of the conducting tracks coming together in a connector that interacts with a complementary connector of the lighting or signaling assembly of the vehicle.

18. The module according to claim 16, wherein the first conductor terminals of said at least one organic electroluminescent diode and the intermediate connection element are arranged so that, when the protection cap is placed to cover over the base, each conductor terminal of said at least one organic electroluminescent diode is in contact with a connection layer of the intermediate connection element.

19. The module according to claim 16, wherein the protection cap and the base of the support each comprise complementary means that interacts to allow said protection cap to be held in position on said base.

20. A lighting and/or signaling device of a motor vehicle, wherein the device comprises at least one module according to claim 1.

21. An illumination module for a motor vehicle comprising:
at least one organic electroluminescent diode that is received in a support equipped with a connection to said at least one organic electroluminescent diode and a device to supply electrical power and/or control the electrical power supply of said diode, the support including a hinge that is closed when said diode is connected to the electrical power supply, said diode carrying at least one first conductor terminal designed to be connected electrically to at least a second conductor terminal of an intermediate connection element, the intermediate connection element including at least an insulating part of which is produced from flexible material and including at least one conducting part, the insulating part and the at least one conducting part being arranged between said first and second conductor terminals when they are electrically connected,
wherein the intermediate connection element comprises at least one connection portion produced from a conducting material and one damping portion produced from a flexible material, and
wherein the connection portion comprises a connection layer, and the damping portion comprises at least two damping layers between which the connection layer is arranged.

* * * * *